US006904469B2

(12) United States Patent
Ido et al.

(10) Patent No.: US 6,904,469 B2
(45) Date of Patent: Jun. 7, 2005

(54) STORAGE CONTROL APPARATUS (75) Inventors: Takeshi Ido, Tokyo (JP); Youichi Gotoh, Tokyo (JP); Shizuo Yokohata, Tokyo (JP); Shigeo Honma, Tokyo (JP); Toshiyuki Yoshino, Yokohama (JP)

(73) Assignees: Hitachi, Ltd. (JP); Hitachi Software Engineering Co., Ltd. (JP)

( * ) Notice: Subject to any disclaimer, the term of this patent is extended or adjusted under 35 U.S.C. 154(b) by 443 days.

(21) Appl. No.: 09/944,946

(22) Filed: Aug. 31, 2001

(65) Prior Publication Data

US 2002/0038391 A1 Mar. 28, 2002

(30) Foreign Application Priority Data

Sep. 28, 2000 (JP) ........................................ 2000-300563

(51) Int. Cl.⁷ .............................................. G06F 13/14
(52) U.S. Cl. ........................... 710/6; 711/114; 711/168
(58) Field of Search ............................. 710/6; 711/114, 711/168

(56) References Cited

U.S. PATENT DOCUMENTS

| 6,101,588 | A | * | 8/2000 | Farley | 711/168 |
| 6,145,006 | A | * | 11/2000 | Vishlitsky et al. | 709/229 |
| 6,169,700 | B1 | * | 1/2001 | Luo | 365/230.05 |
| 6,438,648 | B1 | * | 8/2002 | McKean et al. | 711/114 |

FOREIGN PATENT DOCUMENTS

| JP | 03-246713 | 11/1991 |
| JP | 05-108485 | 4/1993 |
| JP | 08-263380 | 10/1996 |
| JP | 08-305653 | 11/1996 |
| JP | 09-325905 | 12/1997 |
| JP | 11-149350 | 6/1999 |
| JP | 11-184639 | 7/1999 |
| JP | 11-316653 | 11/1999 |
| JP | 2000-020445 | 1/2000 |

* cited by examiner

*Primary Examiner*—A. Elamin
(74) *Attorney, Agent, or Firm*—Townsend and Townsend and Crew LLP (57) ABSTRACT

In response to requests for I/O processing sent from a computer, I/O which should be processed at a priority is enabled to be processed without being affected by other processing, by classifying I/O into those to be processed at a priority and those not to be processed at a priority. The storage control apparatus comprises an I/O processing controller with a memory that is common for the whole controller. The storage control apparatus manages information for dividing and controlling a plurality of I/O processes as priority and non-priority in that memory and operates while suppressing non-priority I/O processing on the basis of information in the memory.

10 Claims, 12 Drawing Sheets

FIG.12

STORAGE CONTROL APPARATUS

BACKGROUND OF THE INVENTION

1. Field of the Invention

The present invention relates to a storage control apparatus, and more particularly to a technique for a load balance control system between a computer and the storage control apparatus performing I/O processing with that computer.

2. Description of the Related Art

In recent computer systems, the over all performance can easily be limited by the I/O processing of the storage control apparatus. As a result, for I/O from a computer, the storage control apparatus must execute each I/O process at the maximum capacity possible with that storage control apparatus. Also, the storage control apparatus must simultaneously execute the I/O processing requests from a plurality of computers and through a plurality of paths.

In general, cache memory is used as means for improving the performance of a storage control apparatus. I/O processing performance can thereby be improved by leaving frequently accessed data in a cache as much as possible with a least recently used (LRU) algorithm control or the like. In some cases, however, the expected I/O processing performance is not attained because the data left in the cache is not necessarily frequently accessed data, and the cache hit rate does not rise due to the access data pattern in the I/O processing.

Means for resolving this type of problem include, for example, the technology disclosed in Japanese Patent Laid-open Publication No. H08-263380. In this approach, the access history from the host is recorded and analyzed and effective data is left in the cache for a long period, but data that is ca died but judged to be meaningless is actively removed from the cache. The cache hit rate thereby increases and I/O processing performance improves.

BRIEF SUMMARY OF THE INVENTION

The technology disclosed in the above mentioned report is an effective measure, especially when usable cache memory resources are available. As the I/O processing load increases, however, waiting time for securing usable cache memory resources develops and the I/O processing throughput decreases because the above-mentioned cache memory resources are used over the above-mentioned plurality of paths. Also, waiting time for securing cache memory resources develops in the case where a plurality of computers require the same cache memory resources at the same time. In the case of competition for securing cache memory resources between high and low I/O processing priority computers at work, the processing of the lower I/O processing priority computer will negatively affect the processing of the higher I/O processing priority computer.

Also, as the percentage of cache memory used in the storage control apparatus as a whole increases, competition for securing cache memory resources develops. For example, relatively low processing priority I/O such as that performed in the background will negatively affect high processing priority I/O such as that executed online.

It is an object of the present invention to provide a storage control apparatus for processing I/O issued by a plurality of computers over a plurality of paths to a plurality of storage devices, wherein relatively low processing priority I/O does not affect high processing priority I/O and the processing performance of the storage control apparatus as a whole is sustained.

In order to achieve the above-mentioned object, shared processor memory established within the storage control apparatus is provided priority channel port information for each channel port unit, defines target I/OPS (I/O per second) information for channel ports set as "priority," and performs feedback control of I/O processes for channel ports that are not set as "priority" so that the target number of I/O processes for "priority" ports can reach the target I/OPS.

Also, the shared processor merry is provided priority host information for each computer, defines the target I/OPS information for the computers set as "priority," and performs feedback control of I/O processes for computers that are not set as "priority" so that the target number of I/O processes for "priority" computers can reach the target I/OPS.

Likewise, the shared processor memory is provided priority device information for each device, defines the target I/OPS information for the devices set as "priority," and performs feedback control of I/O processes for devices that are not set as "priority" so that the target number of I/O processes for "priority" devices reaches the target I/OPS.

DETAILED DESCRIPTION OF THE INVENTION

The present invention is explained below with reference to the drawings.

Figure 1:
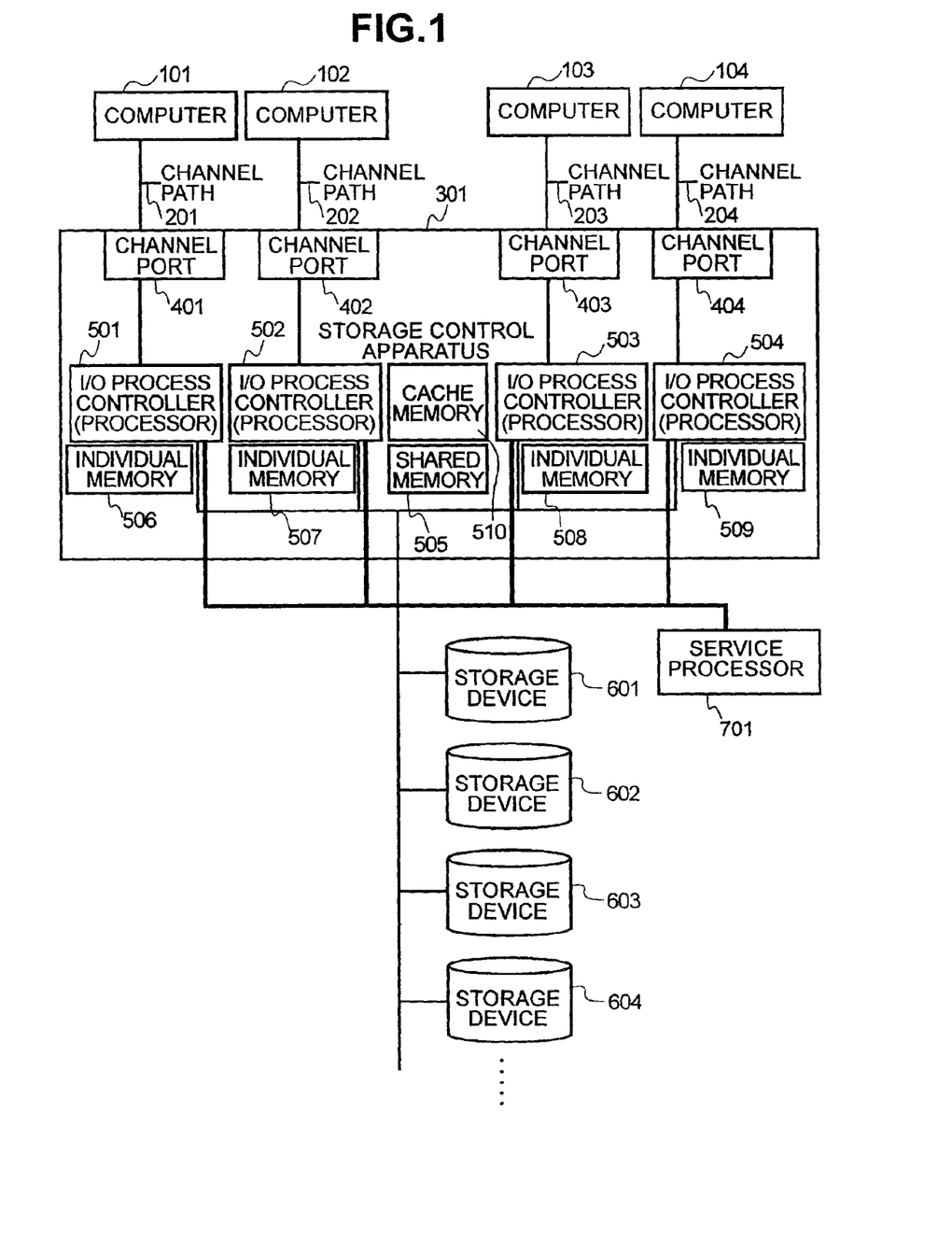
FIG. 1 is a drawing showing a schematic of a computer system for performing I/O processing with a plurality of devices under the control of a storage control apparatus having a service processor and a plurality of processors that can communicate therewith.

FIG. 1 is a drawing showing an embodiment of a computer system relating to the present invention. In the computer system in FIG. 1, the storage control apparatus 301 is connected to computers 101 through 104 through channel paths 201 through 204 and controls I/O processes requested for a plurality of storage devices 601, 602, 603, 604. The storage control apparatus 301 comprises channel ports 401 through 404, 10 process controllers (processors) 501 through 504, individual memory 506 through 509 provided for each controller, shared memory 505 which can be accessed from the I/O process controllers (processes) 501 through 504, and cache memory 510. The I/O process controllers 501 through 504 perform data input and output for the plurality of storage devices 601 individually. The shared memory 505 contains a channel port information management table 511, a host information management table 521, and a storage device information management table 531 for determining the priority of I/O processes when executing I/O process requests from the computers 101 through 104. At the start of every I/O process, it is determined whether the I/O process can be started based on these tables. The I/O operations are controlled as follows. With the channel port information management table 511, it is checked whether the I/O-object channel path for the process to be started is "priority". If it is priority, the process continues without further changes; and if not priority, the I/O process is executed while I/O on that channel is suppressed to certain extent. Likewise, with the host information management table 521, it is checked whether the I/O-object computer for the 0process to be started is "priority". With the storage device information management table 531, it is checked whether the I/O-object storage device for the process to be started is "priority".

Figure 2:
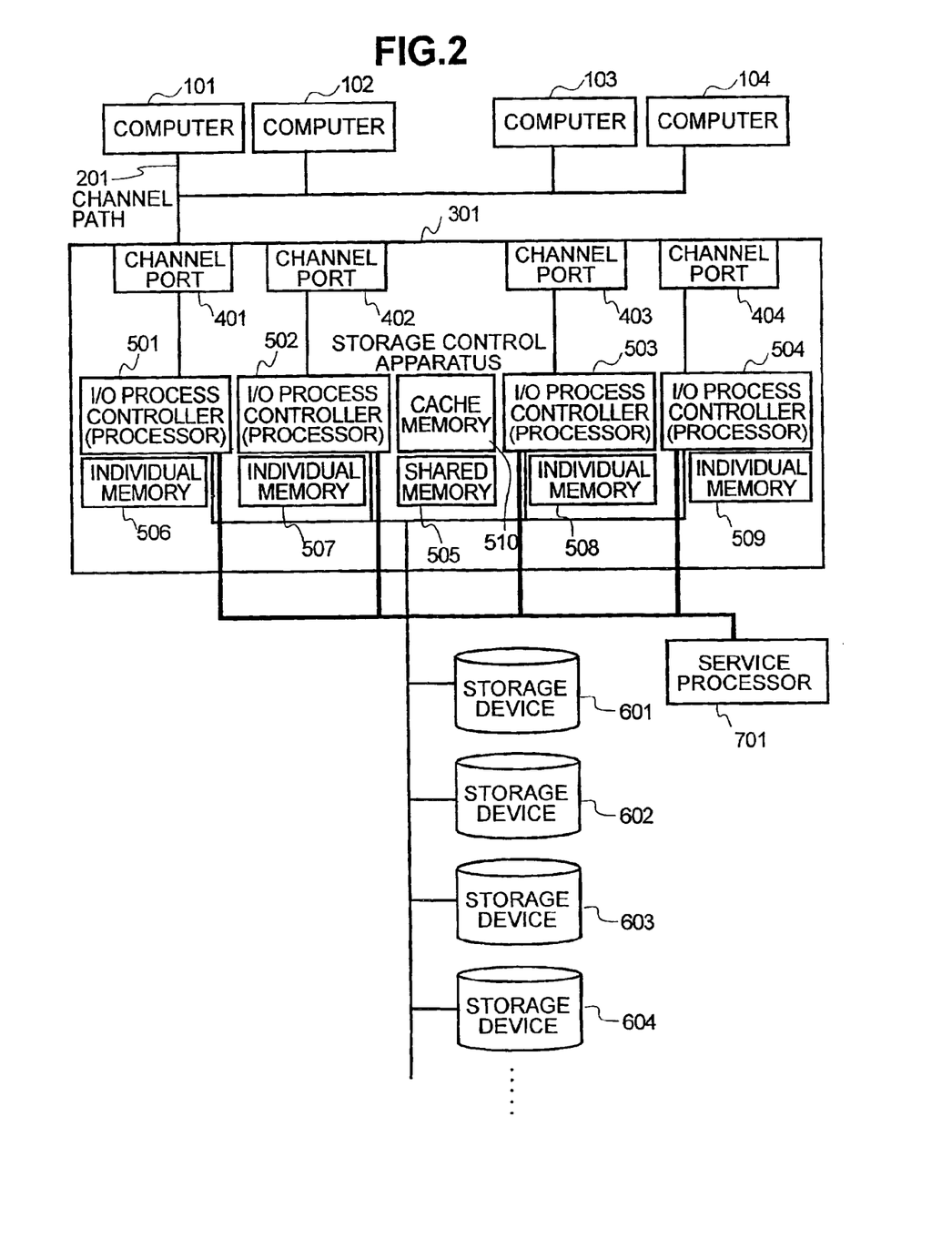
FIG. 2 is a drawing showing a schematic of a computer system wherein a plurality of computers are connected on a single channel port and perform I/O processing with a plurality of storage devices under the control of a storage control apparatus.

FIG. 2 shows a constitution wherein the computers 101 through 104 are all connected to the channel port 401 in the storage control apparatus 301. In this case, because the I/O is concentrated in a single channel port, the priority computers are defined with the settings in the host information management table 521, without any effect from the information in the cannel port information management table 511, when it is desired to provide levels of priority among the computers 101 through 104. The influence of other computers on I/O processing can be suppressed. In the case where the settings in the host information management table 521 are not by computer but by World Wide Name, the priority level can be provided to the path of the World Wide Name.

Figure 3:
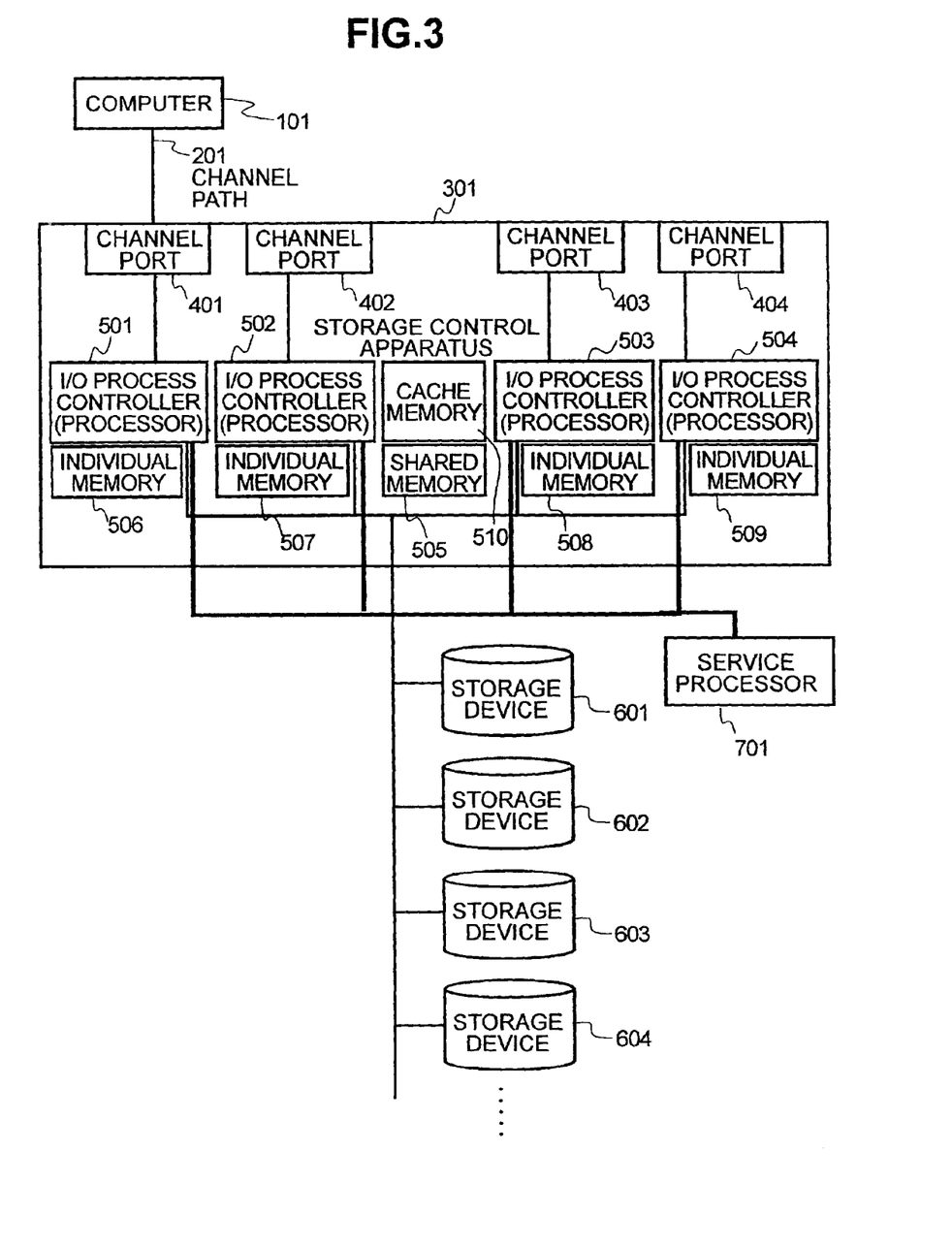
FIG. 3 is a drawing showing a schematic of a computer system wherein a single computer performs I/O processing with a plurality of storage devices under the control of a storage control apparatus.

FIG. 3 shows a constitution wherein only a computer 101 is connected to a channel port 401 in the storage control apparatus 301. In this case, the I/O is on only one cannel port and there are no other computers to affect the I/O. The priority storage devices are defined with the settings in the storage device information management table 531 and the influence of I/O processing of other storage devices can be suppressed, without any effect from the information in the channel port information management table 511 and the host information management table 521, when it is desired to provide levels of priority among the storage devices 601 through 604 . . .

Figure 4:
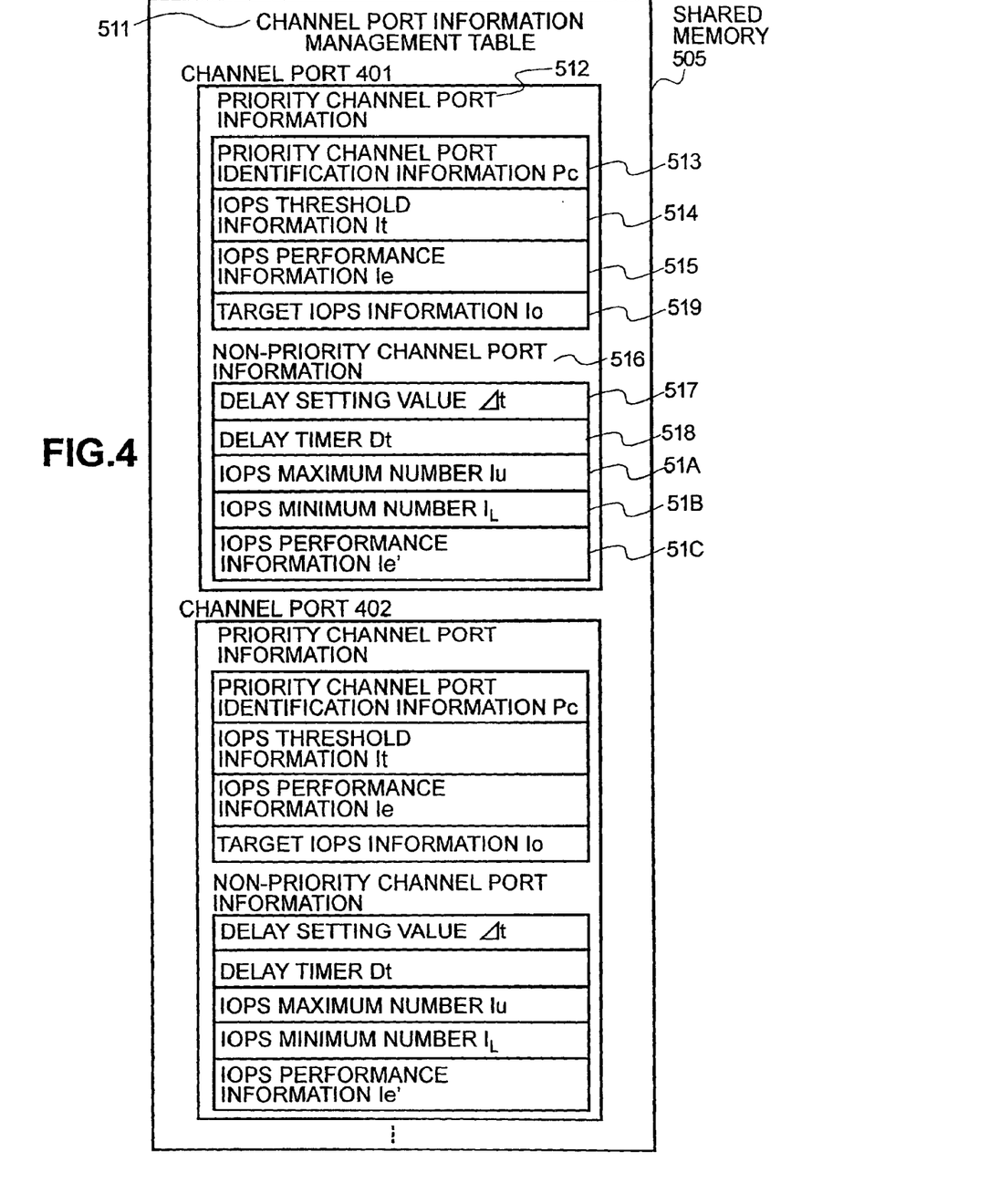
FIG. 4 is a table for managing and controlling the priority/non-priority settings of channel ports in the shared memory in the storage control apparatus.

FIG. 4 is a drawing of the channel port information management table 511 stored in the common memory 505. The channel port information management table 511 manages information for each channel port. The information is divided into priority channel port information 512 and non-priority channel port information 516. The priority channel port information 512 comprises the following: priority channel port identification information Pc513 for identifying whether a channel port is a priority channel port; IOPS threshold information It514 for determining whether a non-priority channel port suppresses I/O processing; IOPS performance information Ie515 for indicating the actual performance status of the channel port; and target IOPS information Io519 for setting the I/O process performance that is the goal, when setting a channel port as a priority channel port. Specifically, the IOPS threshold information It514 is compared with the IOPS performance information Ie515 calculated from the number of current 10. When the IOPS performance information Ie515 exceeds the IOPS threshold information It514, I/O processing will be suppressed for a channel port that is not set as "priority,".

Also, the non-priority channel port information 516 comprises the following: a delay setting value dt517 for suppressing I/O processes in the case where the channel port is a non-priority channel port; a delay timer Dt518; IOPS maximum number Iu51A for setting the maximum number of I/O processes; IOPS minimum number IL51B for setting the minimum number when suppressing I/O processes; and IOPS performance information Ie51C. Specifically, when the above-mentioned IOPS performance information Ie514 exceeds the IOPS threshold information It514, the non-priority channel port information is used to delay the start of I/O processes received from a non-priority channel port by the delay setting value dt517 put I/O processes on standby. The timer Dt518 is a region for counting up the time of the delay setting value dt517; the value is initialized and the count by the timer starts upon reception of the delay setting value from a non-priority channel port.

Figure 5:
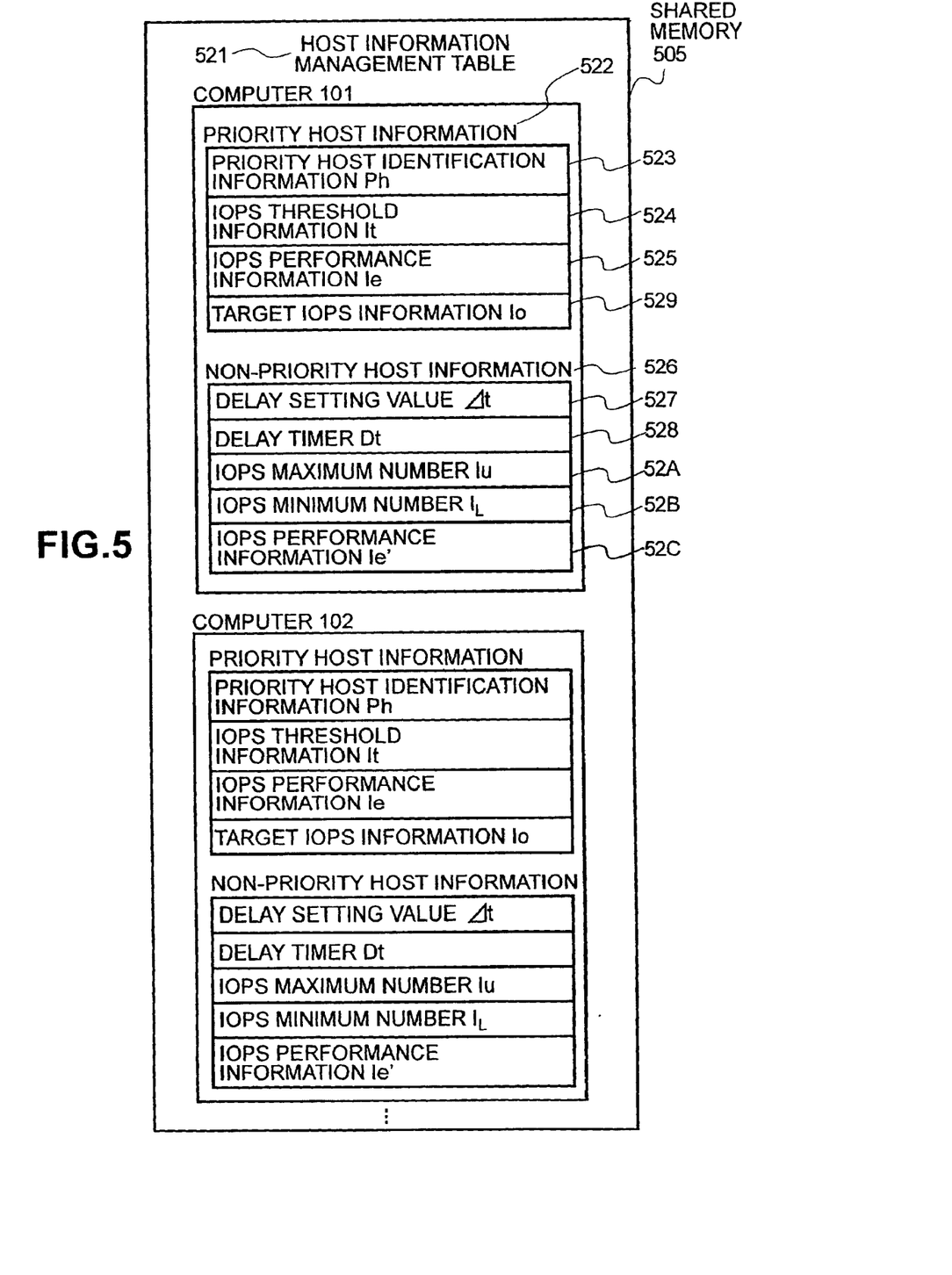
FIG. 5 is a table for managing and controlling the priority/non-priority settings of hosts in the shared memory in the storage control apparatus.

FIG. 5 is a drawing of the host information management table 521 stored in the common memory 505. The host information management table 521 manages information for each host. This information is divided into priority host information 522 and non-priority host information 526. The priority host information 522 comprises the following: priority host identification information Ph523 for identifying whether a host is a priority host; IOPS threshold information It524 for determining whether a non-priority host suppresses I/O processing; IOPS performance information Ie525 for indicating the actual performance status of the host; and target IOPS information Io529 for setting the I/O process performance that is the goal, when setting a host as a priority host. Also, the non-priority host information 526 comprises the following: a delay setting value dt527 for suppressing I/O processes in the case where the host is a non-priority host; a delay timer Dt528; IOPS maximum number Iu52A for setting the maximum number of I/O processes; IOPS minimum number IL52B for setting the minimum number when suppressing I/O processes; and IOPS performance information Ie52C.

Figure 6:
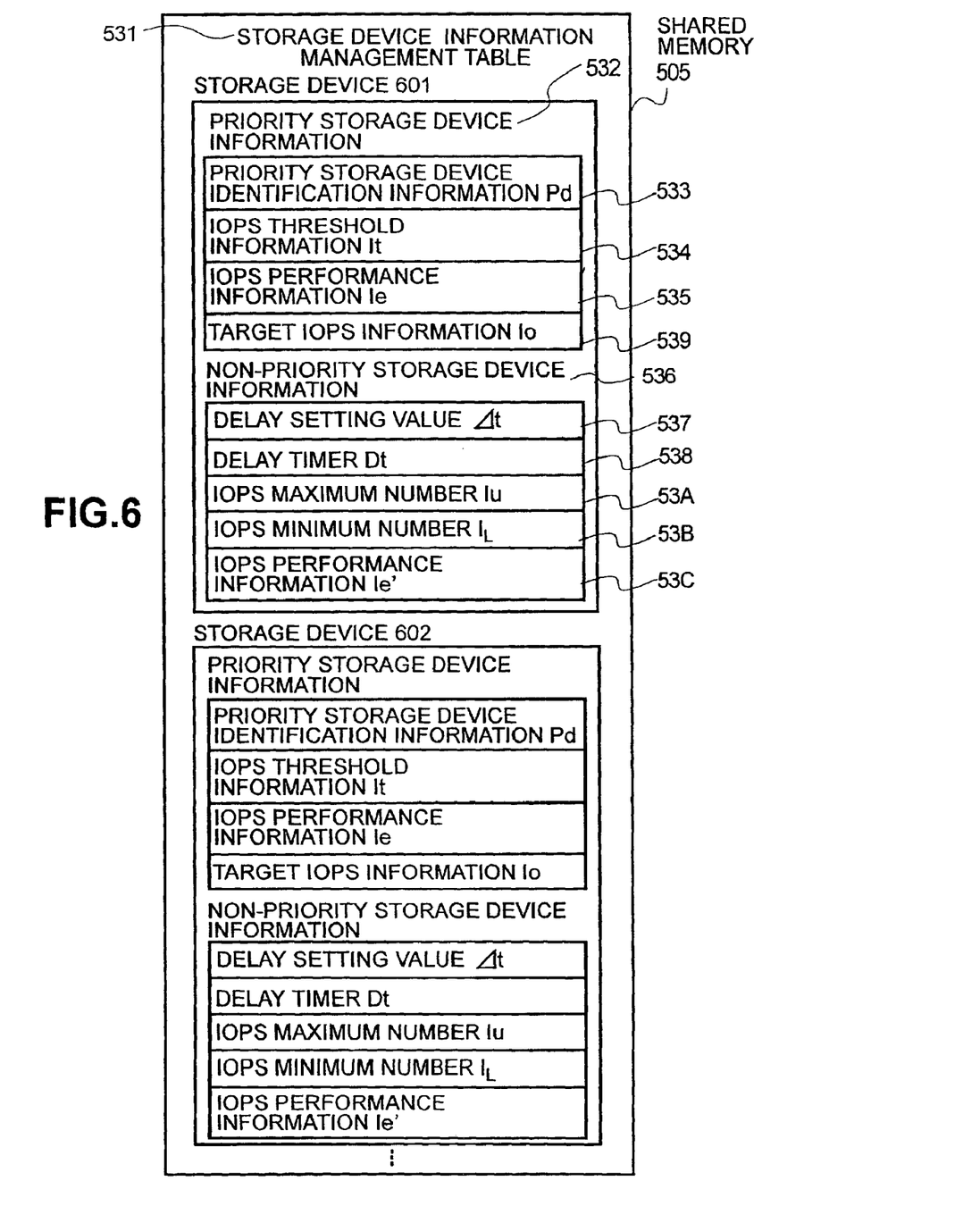
FIG. 6 is a table for managing and controlling the priority/non-priority settings of storage devices in the shared memory in the storage control apparatus.

FIG. 6 is a drawing of the storage device information management table 531 stored in the common memory 505. The storage device information management table 531 manages information for each storage device. This information is divided into priority storage device information 532 and non-priority storage device information 536. The priority storage device information 532 comprises the following: priority storage device identification information Pd533 for identifying whether a storage device is a priority storage device; IOPS threshold information It534 for determining whether a non-priority storage device suppresses I/O processing; IOPS performance information Ie535 for indicating the actual performance status of the storage device; and target IOPS information Io539 for setting the I/O process performance that is the goal, when setting a storage device as a priority storage device. Also, the non-priority storage device information 536 comprises the following: a delay setting value dt537 for suppressing I/O processes in the case where the storage device is a non-priority storage device; a delay timer Dt538; IOPS maximum number Iu53A for setting the maximum number of I/O processes; IOPS minimum number IL53B for setting the minimum number when suppressing I/O processes; and IOPS performance information Ie53C.

Figure 7:
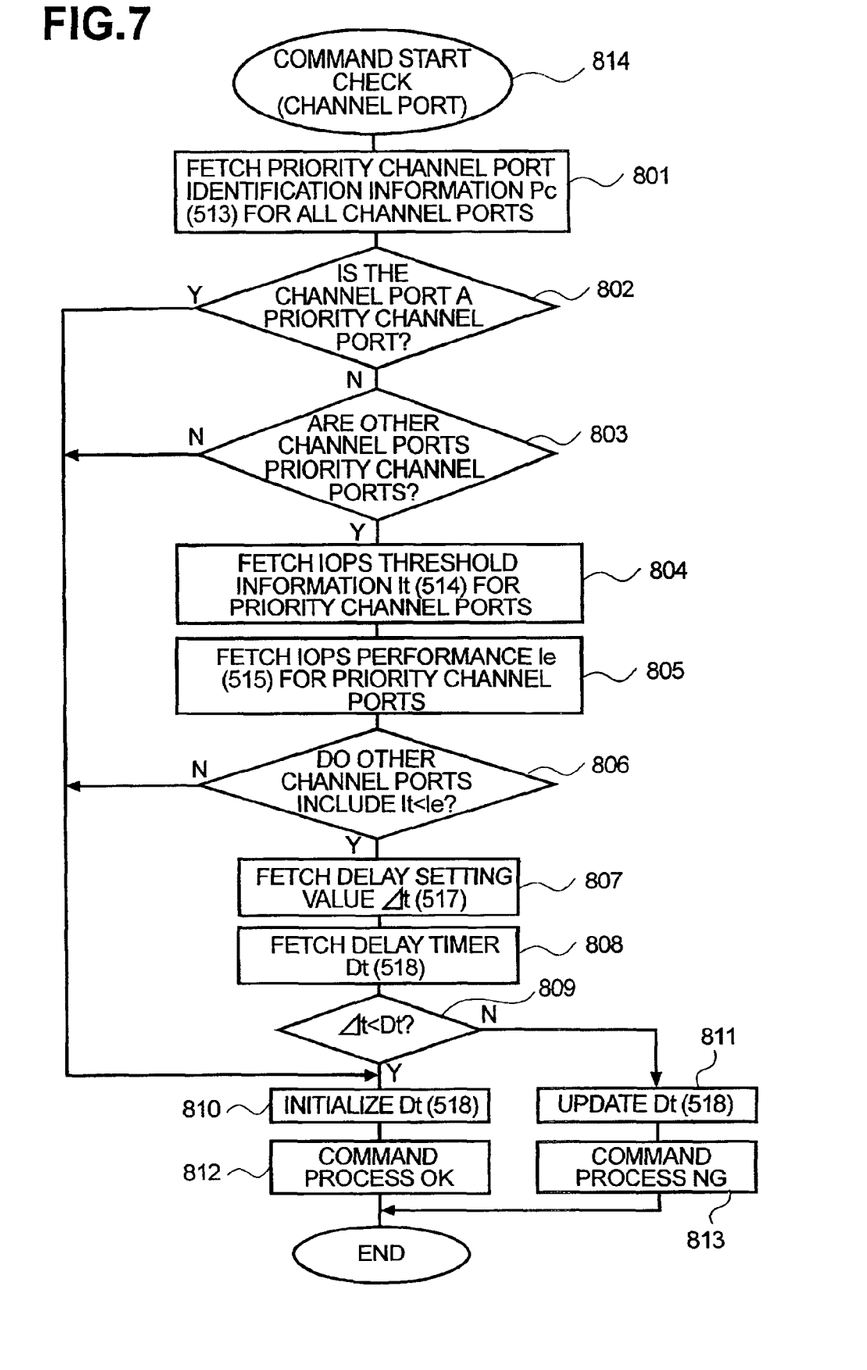
FIG. 7 is a flowchart showing the process for determining whether a channel port is priority/non-priority and checking whether a command can be started.

FIG. 7 is a drawing showing the flow for checking whether it is possible to start a command in an I/O process with the channel port as the parameter. In the flow in FIG. 7, the priority channel port identification information Pc is fetched 801. If the channel port is a priority channel port, the process ends with the command process OK 802. If the channel port is not a priority channel port, it is checked whether a priority channel port is present among other ports. If a priority channel port is not present, the process ends with the command process OK 803. If a priority channel port is present among other ports, the IOPS threshold information It and IOPS performance information Ie for the priority channel port are fetched 804, 805; and the process ends with the command process OK if there is no port where It<Ie among the other channel ports 806. When there is a port with It<Ie, the delay setting value dt and delay timer Dt of the channel port are fetched 807, 808. While Dt is updated until dt<Dt 811, the command process is made NG 813. When dt becomes less than Dt 809, Dt is initialized 810 end the command process in made OK 812. In this way, a non-priority channel port is prevented from influencing the I/O of a priority channel port by suppressing its own I/O.

Figure 8:
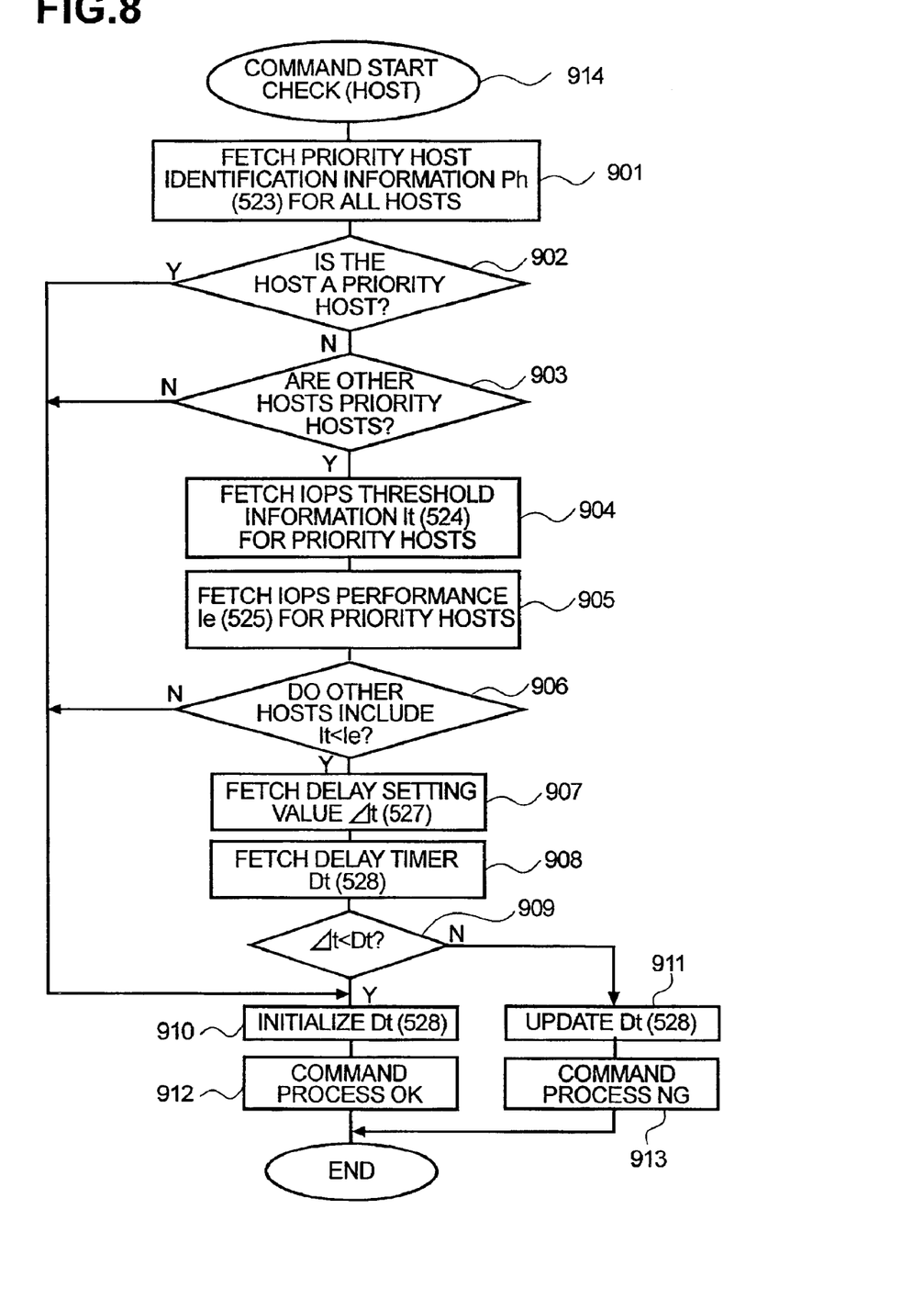
FIG. 8 is a flowchart showing the process for determining whether a host is priority/non-priority and checking whether a command can be started.

FIG. 8 is a drawing showing the flow for checking whether it is possible to start a command in an I/O process with the host as the parameter. In the flow in FIG. 8, the priority host identification information Ph is fetched 901. If the host is a priority host, the process ends with the command process OK 902. If the host is not a priority host, it is cheated whether a priority host is present among other hosts. If a priority host is not present, the process ends with the command process OK 903. If a priority host is present among other hosts, the IOPS threshold information It and IOPS performance information Ie for the priority host are fetched 904, 905; and the process ends with the command process OK if there is no host where It<Ie among the other hosts 906. When there is a host with It<Ie, the delay setting value dt and delay timer Dt of the host are fetched 907, 908. While Dt is updated until dt <Dt 911, the command process is made NG 913. When dt becomes less than Dt 909, Dt is initialized 910 and the command process is made OK 912. In this way, a non-priority host is prevented from influencing the I/O of a priority host by suppressing its own I/O.

Figure 9:
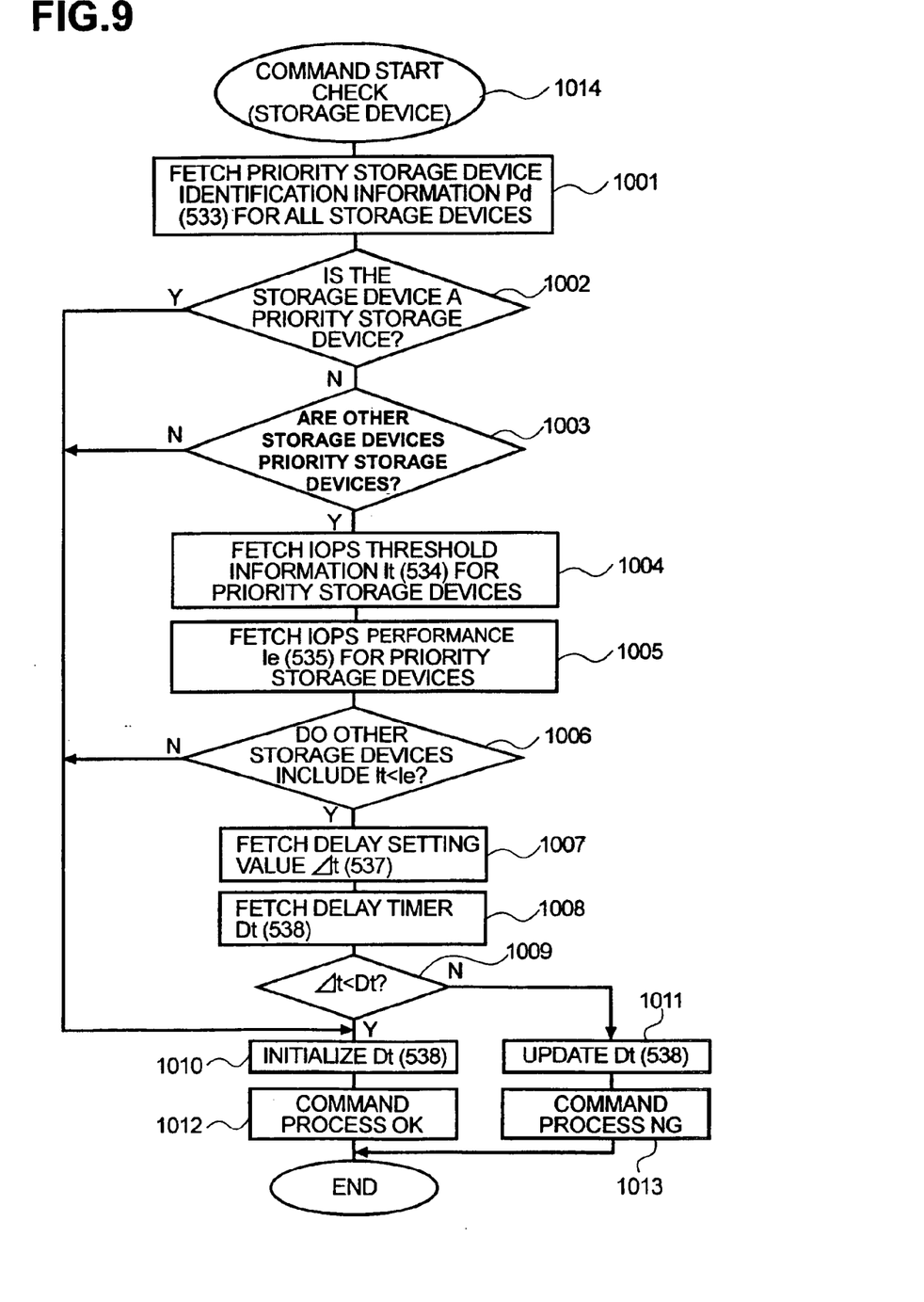
FIG. 9 is a flowchart showing the process for determining whether a storage device is priority/non-priority and checking whether a command can be started.

Likewise, FIG. 9 is a drawing showing the flow for checking whether it is possible to start a command in an I/O process with the storage device as the parameter. In the flow in FIG. 9, the priority storage device identification information Pd is fetched 1001. If the storage device is a priority storage device, the process ends with the can mind process OK 1002. If the storage device is not a priority storage device, it is checked whether a priority storage device is present among other storage devices. If a priority storage device is not present, the process ends with the command process CK 1003. If a priority storage device is present among other storage devices, the IOPS threshold information It and IOPS performance information Ie for the priority storage device are fetched 1004, 1005; and the process ends with the command process OK if there is no storage device where It<Ie among the other storage device 1006. When there is a storage device with It<Ie, the delay setting value dt and delay timer Dt of the storage device are fetched 1007, 1008. While Dt is updated until dt<Dt 1011, the command process is made NG 1013. When dt becomes less than Dt 1009, Dt is initialized 1010 and the command process is made CSC 1012. In this way, a non-priority storage device is prevented from influencing the I/O of a priority storage device by suppressing its own I/O. Furthermore, as in FIGS. 4 and 9, other control methods divide areas within the storage devices into priority areas and non-priority areas and suppress the I/O processing for non-priority areas so as not to influence the I/O processing of areas set as "priority-"within the same storage device.

Figure 10:
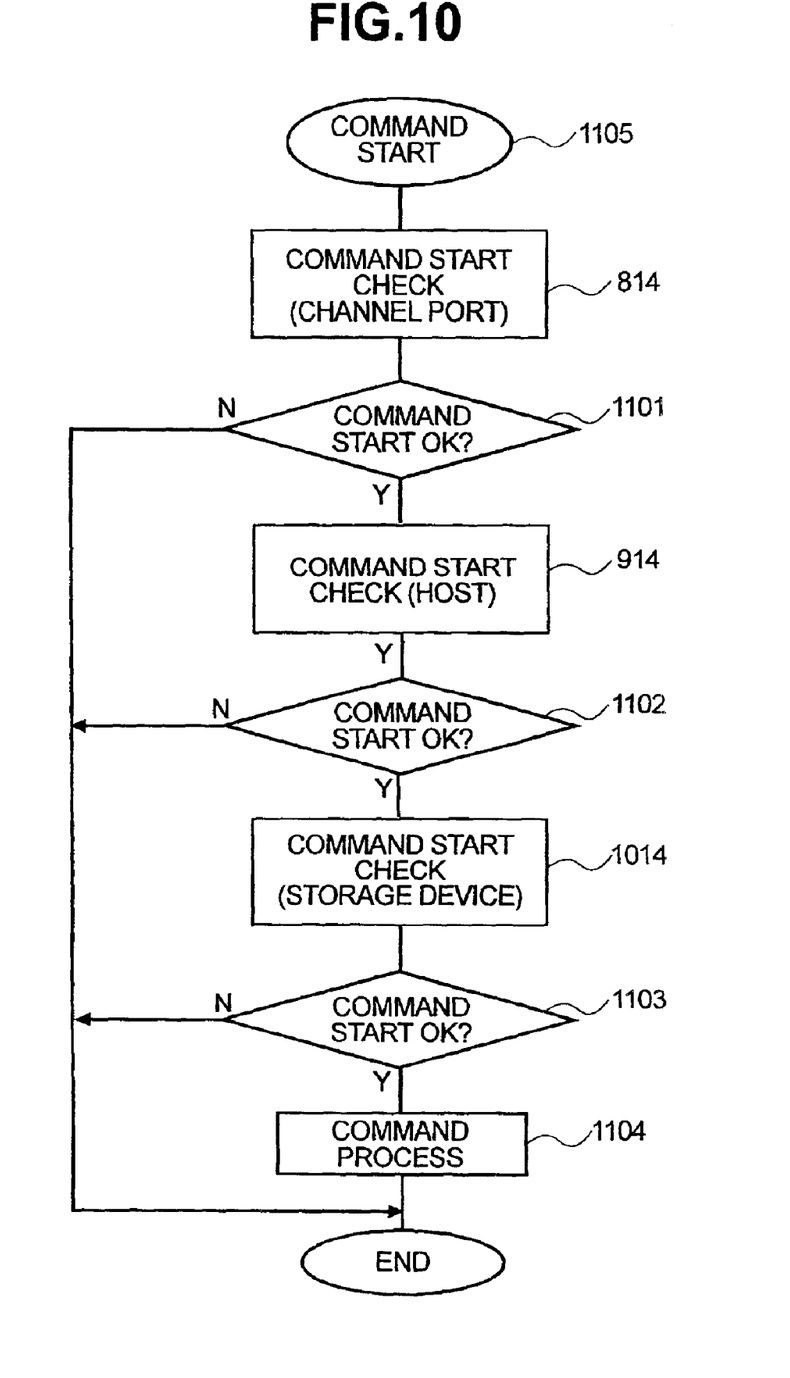
FIG. 10 is a flowchart showing the process for determining whether channel ports, hosts, and storage devices are priority/non-priority and checking whether a command can be started.

FIG. 10 shows an example combining the command start check by channel port 814, the command start check by host 914, and the command start check by storage device 1014. In the example in FIG. 10, in the case where the channel port, host, and storage device are all set as "priority," I/O processing is not suppressed except in the case where all parameters in the I/O processing satisfy "priority". Other I/O processes are delayed in order to prevent effects on the above-mentioned I/O pressing. Also, in the command process 1104, except for read or write processes according to the command, it is sometimes the case that the next I/O process is assumed and a pre-read process for other than the object reword is performed. For this type of process as well, however, the pre-read process will be suppressed unless the channel port, host, and storage device are all set as "priority".

Figure 11:
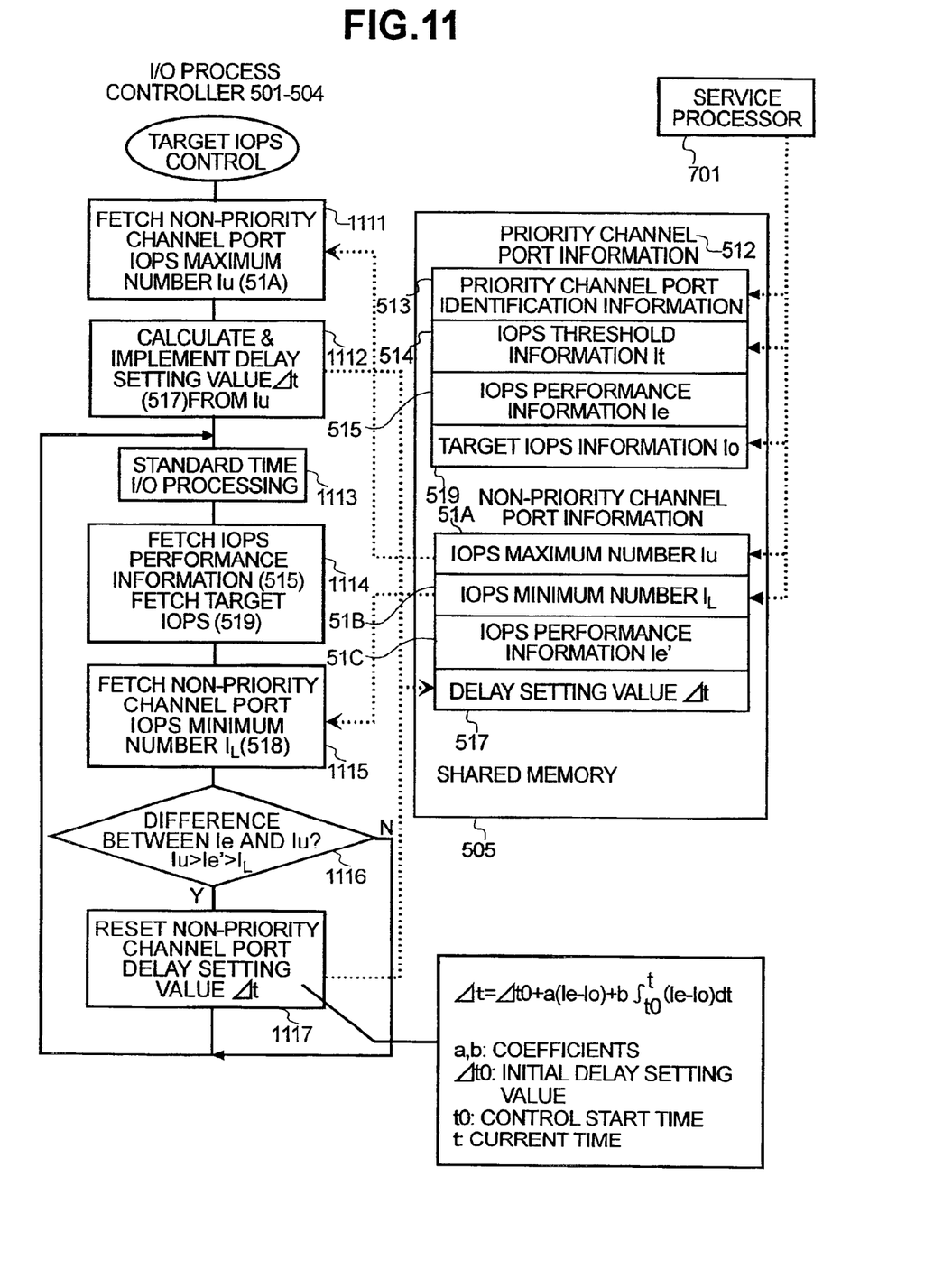
FIG. 11 is a flowchart showing the process for setting the channel port information to priority/non-priority from the service processor and, based on this information, adjusting the delay for I/O of channel ports set as "non-priority" based on the processing of channel ports set as "priority"

FIG. 11 is a drawing showing a flowchart wherein the IOPS of the priority channel port is controlled to approach most closely to the target IOPS by setting information from the service processor 701 connected with the storage control apparatus and adjusting the delay of the I/O process of the non-priority channel port. The following information is set from the service processor 701: priority channel port identification information 513, IOPS threshold information 514, target IOPS information 519, and IOPS maximum number 51A and IOPS minimum number 51B of the non-priority channel port. The value of the IOPS maximum number 51A is set to an estimated value conforming to the actual environment because the extent of the influence on the I/O processing of the priority channel port is not known precisely. In the I/O process control portion, the set IOPS maximum number is fetched 1111, the I/O process delay setting value dt517 is calculated from the IOPS maximum number 1112, and the I/O process is carried out for a standard time based on this value 1113. After that, IOPS performance information Ie515 and target IOPS information Io519 of the priority channel port, and the IOPS minimum number IL51B of the non-priority channel port are fetched 1114, 1115. If there is no difference between Ie and Io (or when that difference is judged to be small enough to be ignored), the I/O processing capacity of the priority channel port is determined to have reached the target. The delay setting value 517 is not changed and the I/O process continues. Even if the I/O processing of the priority channel port could not reach the target, adjustment is judged to be impossible even in the case where the I/OPS of the port is no longer within the range of Iu and IL, the delay setting value dt517 is not changed and the I/O process continues. In other cases, the delay setting value dt is reset based on the formula in the drawing and the process returns to step 1113. The optimum delay setting value dt can be found by repeating these steps.

Information for priority/non-priority hosts and for priority/non-priority storage devices can be set in the same way as information for priority/non-priority channel ports.

Figure 12:
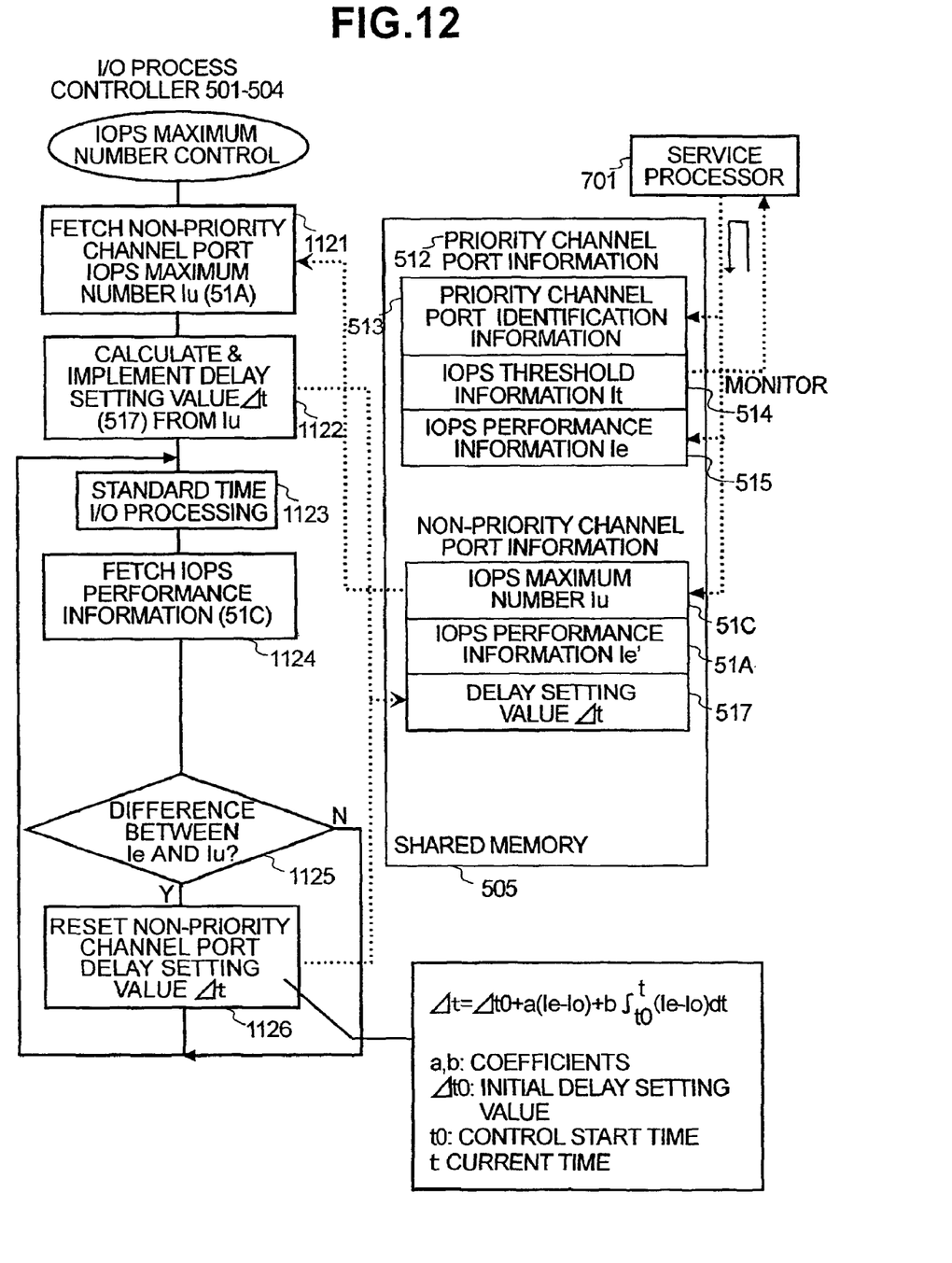
FIG. 12 is a flowchart showing the process for setting the channel port information to priority/non-priority from the service processor and, based on this information, adjusting the delay for I/O of channel ports set as "non-priority" based on the maximum value for channel ports set as "non-priority," so as to minimize the influence on I/O processing of channel ports set as "priority".

FIG. 12 is a drawing showing a flowchart wherein the I/OPS of a priority channel port is made to approach most closely to the target I/OPS by adjusting the delay of the I/O processing of non-priority channel ports based on information set from the service processor 701 connected to the storage control apparatus, controlling the I/OPS of non-priority channel ports to approach the IOPS maximum number for non-priority channel ports; and controlling the I/O processing of non-priority channel ports. The following information is set from the service processor 701: priority cannel port identification information 513, IOPS threshold information 514, and the IOPS maximum number Iu51A of the non-priority channel port. The value of the IOP S maximum number Iu 51A is set to an estimated value conforming to the actual environment because the extent of the influence on the I/O processing of the priority channel port is not known precisely. In the I/O process control portion, the set IOPS maximum number is fetched 1121, the I/O process delay setting value dt517 is calculated from the IOPS maximum number 1122, and the I/O process is carried out for a standard time based on this value 1123. After that, IOPS performance information Ie51C of the priority channel port is fetched 1124. If there is no difference between Ie and Iu (or when that difference is judged to be small enough to be ignored), the I/O processing capacity of the priority channel port is determined to have reached the target. The delay setting value dt 517 is not changed and the I/O process continues.

In other cases, the delay setting value dt is reset based on the formula in the drawing 1126 and the process returns to step 1123. The optimum delay setting value dt can be found by repeating these steps. As a result, if the I/OPS of the priority channel port does not reach the value that is the goal, the optimum I/O process state is arrived at by repeatedly resetting the value of the I/OPS maximum number Iu51A from the service processor 701. Information for priority/non-priority hosts and for priority/non-priority storage devices can be set in the same way as information for priority/non-priority channel ports.

With the above-mentioned system, it is possible to maximize the processing capacity of I/O to be performed at a high priority by carrying out the processing while restricting I/O for which priority levels can be dropped.

The present invention has the following effects as a system for sustaining the processing capacity of I/O to be performed at a high priority by processing while restricting I/O for which priority levels can be dropped.

(1) In the case of performing I/O processing with a plurality of channel ports, the channel port for which sustained capacity is desired is set as a priority channel port. Accordingly, it is possible for the channel ports set as a priority channel port to maintain a constant capacity even if I/O processing enters an overloaded state for the storage control apparatus as a whole.

(2) In the case of a plurality of hosts concentrated at a single channel port, the host for which sustained capacity is desired is set as a priority host. Accordingly, it is possible for the host set as a priority host to maintain a constant capacity even if I/O processing enters an overloaded state for the storage control apparatus as a whole.

(3) In the case where one host performs I/O processing for a plurality of storage devices, the storage device, for which priority is desired is set as a priority storage device. Accordingly, it is possible for I/O processing to the storage device set as a priority storage device to maintain a constant rapacity, even if I/O processing enters an overloaded state for the storage control apparatus as a whole.

(4) By combining (1) through (3) above, it becomes possible to specify priority I/O processing conditions, such as sustaining the capacity of only I/O issued on a specific channel path from a specific host to a specific storage devices, and to construct a more finely controlled I/O processing environment.

What is claimed is:

1. A computer system comprising a plurality of computers, a storage control apparatus connected with the plurality of computers on a channel path and for performing input and output through the channel path, and a storage device under the control of the storage control apparatus for storing input/output data of the computers;

wherein said storage control apparatus classifies the plurality of channel ports of the storage control apparatus to which the channel path is connected into priority channel ports and non-priority channel ports, so that channel ports defined as priority channel ports carry out I/O processing without suppressing the processing of I/O from the computers; and channel ports defined as non-priority channel ports are given a target value in I/O process units and carry out processing while performing feedback control so that I/O processing from the computers approaches the I/O process units; and wherein the storage control apparatus controls the level of the influence of the non-priority channel port I/O processing on priority channel port I/O processing.

2. The computer system according to claim 1, wherein the storage control apparatus defines a target value of I/O processing units for the priority channel ports, and carries out I/O processing at the non-priority channel ports while performing feedback control so that the I/O processing of the priority channel ports approaches the target value in I/O process units; and the storage control apparatus controls the level of the influence of the non-priority channel port I/O processing.

3. The computer system according to claim 1, wherein the storage control apparatus determines, when the I/O frequency of the channel port set as a priority channel port is less than the threshold value, a threshold value for not suppressing I/O processing of non-priority channel ports and does not suppress I/O processing of the non-priority channel port, whereby the I/O processing capacity of the storage control apparatus is sustained.

4. The computer system according to claim 2, wherein the storage control apparatus determines, when the I/O frequency of the channel port set as a priority channel port is less than the threshold value, a threshold value for not suppressing I/O processing of a non-priority channel port and does not suppress I/O processing of the non-priority channel port, whereby the I/O processing capacity of the storage control apparatus is sustained.

5. The computer system according to claim 1, wherein the storage control apparatus classifies hosts into priority hosts and non-priority hosts in units of computers sending I/O processing requests to the storage control apparatus, or in computer path units such as a World Wide Name, and executes I/O processing of non-priority hosts while performing feedback control so that the I/O processing of the non-priority hosts approaches the I/O process units within a single channel port and among channel ports; and the storage control apparatus controls the level of influence of non-priority host I/O processing on priority host I/O processing.

6. The computer system according to claim 1, wherein the storage control apparatus classifies devices into priority devices and non-priority devices in units of storage devices performing I/O processing within the storage control apparatus, and executes I/O processing of non-priority devices while performing feedback control so that the I/O processing of the non-priority devices approaches the target I/O processing unit; and controls the level of influence of non-priority device I/O processing on priority device I/O processing.

7. The computer system according to claim 6, wherein the storage control apparatus classifies the storage area in the storage device into priority and non-priority areas, and executes the I/O processing of non-priority areas while performing feedback control so that the I/O processing of non-priority area approaches the target I/O processing unit; and controls the level of influence of non-priority area I/O processing on priority area I/O processing.

8. A storage system comprising:

a storage control apparatus including a plurality of ports connected with a plurality of computers and a controller for controlling the I/O from the computers; and a storage apparatus including a plurality of storage devices for storing I/O from the computers received by the storage control apparatus;

wherein the controller is provided with a priority information table holding one of a priority or a non-priority value for each of the ports, the priority information table further including a predefined time; and wherein I/O through a port that is associated with a priority value is processed in priority fashion such that the start of I/O processing through ports that are associated with non-priority values are delayed by said predefined time.

9. A storage system comprising:

a storage control apparatus including a plurality of ports connected with a plurality of computers and a controller for controlling the I/O from said computers; and a storage apparatus constituted by a plurality of storage devices for storing I/O from the computers received by said storage control apparatus;

wherein the controller is provided with a priority information table containing a priority or non-priority value for each of the computers, the priority information table further including a predefined time; and wherein I/O from a computer that is associated with a priority value is processed in priority fashion such that the start of I/O processing from computers that are associated with non-priority values are delayed by said predefined time.

10. A storage system comprising:

a storage control apparatus including a plurality of ports connected with a plurality of computers and a controller for controlling the I/O from the computers; and a storage apparatus including a plurality storage devices for storing I/O from the computers received by the storage control apparatus;

wherein the controller is provided with a priority information table containing one of a priority or non-priority value for each of the storage device units, the priority information table further including a predefined time; and the priority information table causes delays by a predefined time of the start of I/O processing for storage devices having non-priority values in the priority information table, wherein I/O with a storage device unit that is associated with a priority value is processed in priority fashion such that the start of I/O processing with storage device units that are associated with non-priority values are delayed by said predetermined time.

* * * * *